United States Patent
Hass (10) Patent No.: US 6,731,158 B1
(45) Date of Patent: May 4, 2004

(54) SELF REGULATING BODY BIAS GENERATOR

(75) Inventor: Kenneth Hass, Albuquerque, NM (US)

(73) Assignee: University of New Mexico, Albuquerque, NM (US)

( * ) Notice: Subject to any disclaimer, the term of this patent is extended or adjusted under 35 U.S.C. 154(b) by 12 days.

(21) Appl. No.: 10/172,158

(22) Filed: Jun. 13, 2002

(51) Int. Cl.[7] .......................... G05F 1/575; H03H 11/26
(52) U.S. Cl. ..................................... 327/537; 327/281
(58) Field of Search ................................. 327/158, 262, 327/263, 264, 276, 277, 278, 281, 534, 535, 537, 172–175

(56) References Cited

U.S. PATENT DOCUMENTS

| | | | |
|---|---|---|---|
| 3,609,414 A | 9/1971 | Pleshko et al. | 327/543 |
| 4,142,114 A | 2/1979 | Green | 327/536 |
| 4,670,670 A | 6/1987 | Shoji | 327/543 |
| 5,682,118 A | 10/1997 | Kaenel et al. | 327/534 |
| 5,744,996 A | 4/1998 | Kötzle et al. | 327/534 |
| 6,150,858 A * | 11/2000 | Sung | 327/156 |
| 6,166,577 A * | 12/2000 | Mizuno et al. | 327/534 |
| 6,466,077 B1 * | 10/2002 | Miyazaki et al. | 327/534 |
| 6,501,313 B2 * | 12/2002 | Boerstler et al. | 327/534 |
| 2002/0079939 A1 * | 6/2002 | Nair et al. | 327/175 |

OTHER PUBLICATIONS

Vadim Gutnik et al., "Embedded Power Supply for Low–Power DSP", IEEE Trans. on VLSI Systems, vol. 5, No. 4, Dec. 1997, pp. 425–435.

Vincent V. Kaenel et al., "A Voltage Reduction Technique for Battery–Operated Systems", IEEE Journal of Solid State Circuits, vol. 25, No. 5, Oct. 1990, pp. 1136–1140.

(List continued on next page.)

Primary Examiner—Timothy P. Callahan
Assistant Examiner—Terry L. Englund
(74) Attorney, Agent, or Firm—Haverstock & Owens LLP (57) ABSTRACT

The back bias voltage on a functional circuit is controlled through a closed loop process. A delay element receives a clock pulse and produces a delay output. The delay element is advantageously constructed of the same materials as the functional circuit so that the aging and degradation of the delay element parallels the degradation of the functional circuit. As the delay element degrades, the transistor switching time increases, increasing the time delay of the delay output. An AND gate compares a clock pulse to an output pulse of the delay element, the AND output forming a control pulse. A duty cycle of the control pulse is determined by the delay time between the clock pulse and the delay element output. The control pulse is received at the input of a charge pump. The charge pump produces a back bias voltage which is then applied to the delay element and to the functional circuit. If the time delay produced by the delay element exceeds the optimal delay, the duty cycle of the control pulse is shortened, and the back bias voltage is lowered, thereby increasing the switching speed of the transistors in the delay element and reducing the time delay. If the throughput of the delay element is too fast, the duty cycle of the control pulse is lengthened, raising the back bias voltage produced by the charge pump. This, in turn, lowers the switching speed of the transistors in both the delay element and the functional circuit. The slower switching speed in the delay element increases time delay. In this manner, the switching speed of the delay element, and of the functional circuit, is maintained at a constant level over the life of the circuit.

33 Claims, 4 Drawing Sheets

OTHER PUBLICATIONS

Shih–Wei Sun et al., "Limitation of CMOS Supply–Voltage Scaling by MOSFET Threshold–Voltage Variation", IEEE Journal of Solid State Circuits, vol. 30, No. 8, Aug. 1995, pp. 947–949.

Koichi Nose et al., "Optimization of $V_{DD}$ and $V_{TH}$ for Low–Power and High–Speed Applications", Proceedings of Asia and South Pacific Design Automation Conference, Jan. 2000, pp. 469–474.

Ricardo Gonzales et al., "Supply and Threshold Voltage Scaling for Low Power CMOS", IEEE Journal of Solid State Circuits, vol. 32, No. 8, Aug. 1997, pp. 1210–1216.

Takayasu Sakurai et al., "Low Power Design of Digital Circuits", International Symposium on Key Technologies for Future VLSI Systems, Jan. 2000, pp. 1–5.

Tadahiro Kuroda et al., "Variable Supply–Voltage Scheme for Low–Power High–Speed CMOS Digital Design", IEEE Journal of Solid State Circuits, vol. 33, No. 3, Mar. 1998, pp. 454–461.

Masayuki Miyazaki et al., "A Delay Distribution Squeezing Scheme with Speed–Adaptive Threshold–Voltage CMOS (SA–Vt CMOS) for Low Voltage LSIs", International of Symposium on Low Power Electronics and Design, 1998, pp. 48–53.

* cited by examiner

SELF REGULATING BODY BIAS GENERATOR

GOVERNMENT LICENSE RIGHTS

The U.S. Government has a paid-up license in this invention and the right in limited circumstances to require the patent owner to license to others on reasonable terms as provided by terms of the Federal Grant No. NAG5-8392 awarded by NASA for the project entitled "RADIATION TOLERANT VLSI".

FIELD OF THE INVENTION

The present invention relates to controlling the back bias on a functional circuit to reduce power consumption by the functional circuit while maintaining switching speed of the transistors at levels sufficient to satisfy system requirements. More particularly, the present invention relates to biasing a MOS integrated circuit through a closed loop circuit configured to measure a time delay created by a delay circuit, and to generate a back bias voltage dependent on the time delay.

BACKGROUND OF THE INVENTION

Although reduction in power consumption has been an ongoing goal in the field of electronics, the proliferation of portable and space based CMOS devices and microprocessor driven apparatuses has created an ever growing need for power conservation, giving rise to a variety of processes and apparatuses for reducing power consumption within personal computers, including a reduction of power within integrated MOS circuits. Power consumption of a digital circuit equals dynamic power consumption plus static power consumption. This relationship can be represented by the formula:

$$\text{power} \approx fCV_{DD}^2 + (V_{DD})(I_{DC}) \qquad 1)$$

where f is the operating frequency, C is the equivalent capacitance of the circuit, and $I_{DC}$ is the static current. Because it has long been recognized that dynamic power consumption is proportional to $V_{DD}^2$, it has been similarly understood that a reduction in supply voltage can dramatically reduce power consumption, as illustrated in a paper by von Kaenel, Macken and Degrauwe entitled "A Voltage Reduction Technique for Battery-Operated Systems" in the IEEE Journal of Solid-State Circuits, Vol. 25, No. 5, October 1990, pages 1136–1140. A reduction of the supply voltage, however, has the unwanted effect of delaying the switching of the transistors within an integrated circuit, thereby slowing down the critical path of the circuit. If the circuit through-put is slowed below a certain minimum threshold, an integrated circuit can no longer function reliably in the environment for which it was designed.

Figure 1:
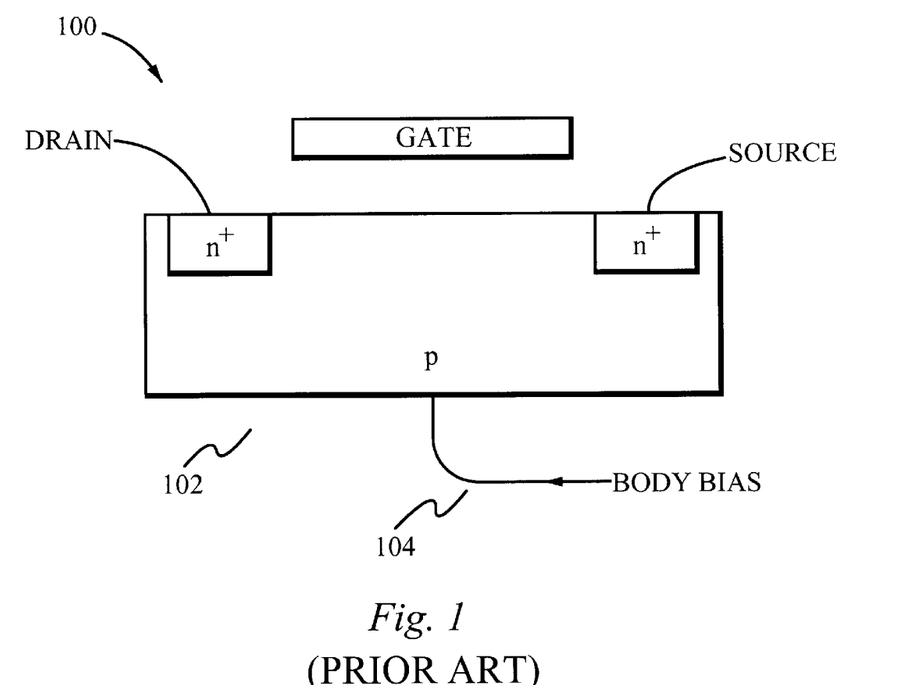
FIG. 1 is an n-channel MOSFET transistor with a connection for applying a body bias voltage.

An alternative approach for reducing power consumption is to raise the threshold voltage of a transistor, typically by a process known as "back biasing" the transistor substrate. FIG. 1 illustrates an n-channel MOS field effect transistor 100 with a "body bias" or "back bias" voltage 104 applied to the substrate 102. Increasing the threshold voltage has the desirable effect of decreasing the transistor's leakage current, thereby reducing power consumption. As the threshold voltage is raised, power consumption is reduced, but the switching speed of the transistor is also slowed. Once again, if the switching time of a transistor becomes excessive, the delay will render the circuit inoperative for the environment in which it is intended to function. To maximize the efficiency in terms of power consumption, designs have been proposed wherein the threshold voltage could be raised such that the circuit speed is just fast enough to satisfy system requirements. A fundamental challenge to this design goal is the fact that, although a transistor threshold is typically fixed when the circuit is manufactured, the threshold voltage will typically vary from chip to chip as a result of manufacturing tolerances. More significantly, a circuit degrades over time, typically from heat and radiation. This degradation affects a variety of functional parameters such as the threshold switching voltage and the switching speed of the transistor. Accordingly, if the threshold voltage is set as high as allowable at the time of manufacture to minimize power consumption, as soon as the transistor speed degrades at all, the transistor will be too slow to satisfy system requirements. Alternatively, if the bias is set such that it allows for a certain degradation of switching speed before the transistor falls below the acceptable lower limit, the power consumption is higher than necessary for much of the life of the transistor.

One solution has been to set the body bias as high as allowable, and lower the bias voltage over the life of the transistor as the transistor slows. To achieve this, however, the circuit must include some means of monitoring or estimating the switching speed of the transistors within a circuit to ensure that the speed remains within system requirements. Earlier methods utilizing a back biasing voltage for power reduction have typically used a single reference transistor selected from among the many transistors comprising a MOS integrated circuit. However, if the gradual degradation of the reference transistor did not exactly match the average degradation of the circuit, the technique was inaccurate. Additionally, earlier methods taking advantage of the body bias effect have been component intensive, variously requiring a fixed reference voltage, a fixed reference current, fixed resistors creating a voltage divider for use as a reference voltage, variable frequency clocks, op-amps, and multiple memory registers for storing data defining various voltage levels for application to a back-bias voltage. These various approaches can be seen in a variety of works, including U.S. Pat. No. 3,609,414 to Pleshko et al. entitled "Apparatus for Stabilizing Field Effect Transistor Thresholds," U.S. Pat. No. 4,142,114 to Green, U.S. Pat. No. 4,670,670 to Shoji, U.S. Pat. No. 5,682,118 to Kaenel et al., U.S. Pat. No. 5,744,996 to Kötzle et al., the above referenced paper by von Kaenel, Macken and Degrauwe, a related paper by Gutnik and Chandraksan entitled "Embedded Power Supply for Low-Power DSP," and a paper entitled "A Delay Distribution Squeezing Scheme with Speed-Adaptive Threshold-Voltage CMOS (SA-Vt CMOS) for Low Voltage LSIs" by Mizuno and Ishibashi, which was presented at the 1998 International Symposium on Low Power Electronics and Design.

There exists therefore a need for a method and apparatus for reducing the power consumption of a CMOS circuit by controlling the back bias voltage applied to a CMOS circuit. There is a further need for a method and apparatus for reducing the power consumption of a CMOS circuit while monitoring the switching speed of the transistors. There is a further need for a method and apparatus for automatically adjusting the back-bias voltage to insure that the CMOS switching speed does not fall below a certain threshold level. There is also a need for a method and apparatus for controlling the back bias voltage over the life of a circuit that is not dependent on a single reference transistor. There is a further need for a method and apparatus for adjusting a back-bias voltage to reduce power consumption which avoids the addition of excessive ancillary components such as fixed reference voltage sources, fixed current sources, fixed resistors forming voltage dividers for reference voltages, variable speed clocks, op-amps, divide-by-N clock-counters, or multiple memory locations storing data defining various voltage levels for application to a back-bias voltage.

BRIEF SUMMARY OF THE INVENTION

The present invention is a method of and apparatus for reducing the power consumption of a CMOS circuit by controlling the back bias voltage applied to a CMOS circuit. The present invention further provides a method of and apparatus for reducing the power consumption of a CMOS circuit while monitoring the switching speed of the transistors. The present invention further discloses a method of and apparatus for automatically adjusting the back-bias voltage to insure that the CMOS switching speed does not fall below system requirements. The present invention further discloses a method of and apparatus for adjusting a back-bias voltage to reduce power consumption while limiting the addition of excessive ancillary components such as fixed reference voltage sources, fixed current sources, fixed resistors forming voltage dividers for reference voltages, variable speed clocks, op-amps, divide-by-N counters and multiple memory locations for storing data defining various voltage levels for application to a back-bias voltage.

An apparatus for regulating a back bias voltage in a functional circuit comprises a closed loop voltage regulator having a charge pump including a charge pump input and a charge pump output, and a delay element including a delay element input, a delay element output, and a delay element body, wherein the delay element body is coupled to the charge pump output. A functional circuit with a body is coupled to the charge pump output such that a charge pump output voltage produced at the charge pump output controls a body bias on the delay element and on the functional circuit. The charge pump output voltage is dependent upon a duty cycle of a control pulse received at the charge pump input. A logic element having a logic element output is coupled to the charge pump input. The logic element further comprises a first logic input coupled to a clock pulse, and a second logic input coupled to the delay element output. The functional circuit comprises a functional circuit input. The clock pulse is advantageously coupled to the delay element input and to the functional circuit input. According to an embodiment of the invention, the logic element is an AND gate. The delay element advantageously comprises a plurality of logical inverters coupled in series. The functional circuit advantageously comprises a CMOS circuit comprising a substrate, wherein the substrate comprises the body of the functional circuit. According to one embodiment, the charge pump output is coupled directly to the substrate of the functional circuit. According to an alternative embodiment, the charge pump output is coupled to the substrate through a proportional element, wherein the back bias voltage applied to the substrate is proportional to the charge pump output voltage.

The delay element and the functional circuit are comprised of materials configured to degrade in performance at a substantially identical rate over time. The charge pump is advantageously comprised of a plurality of pumping stages, wherein a pumping stage comprises a transistor having a gate coupled to a capacitor. According to an embodiment of the present invention, a transistor within a pumping stage exhibits a threshold voltage of less than 110 mV.

A method for regulating a back bias voltage on a functional circuit comprises controlling a duty cycle of a control signal, adjusting an output voltage of a charge pump according to the duty cycle of the control signal, and applying the back bias voltage to the functional circuit, wherein the back bias voltage is related to the output voltage of the charge pump. The step of controlling a duty cycle advantageously comprises the steps of receiving the clock pulse into an input of a delay element, receiving the clock pulse into a first input of a logic element, and receiving an output signal generated at an output of the delay element into a second input of the logic element. According to a preferred embodiment, the logic element is an AND gate. The control signal is generated by the logic element. An output of the logic element is coupled to an input of a charge pump. The delay element and the functional circuit are comprised of materials configured to degrade at a substantially identical rate over time. The charge pump is advantageously comprised of a plurality of pumping stages, a pumping stage comprising a transistor having a gate coupled to a capacitor. According to an embodiment, the delay element comprises a plurality of logical inverters coupled in series.

A functional CMOS circuit comprises a plurality of transistors while maintaining a switching time of the plurality of transistors within an optimum range. A method of reducing power consumption within the functional CMOS circuit comprises the steps of altering a duty cycle of a control-pulse, regulating a back-bias voltage according to the duty-cycle of the control-pulse, and applying the back-bias voltage to the functional CMOS circuit. The control-pulse is advantageously formed at an output of an AND gate. The step of altering the duty cycle of the control-pulse comprises the steps of transmitting a clock input signal into a first input of the AND gate, delaying the clock input signal through a delay element to form a delayed clock signal, and transmitting the delayed clock signal to a second input of the AND gate. The output of the AND gate is coupled to an input of a charge pump. The back bias voltage is proportional to an output voltage of the charge pump. The back-bias voltage is applied to the delay element.

An apparatus for regulating a back bias voltage in a functional circuit comprises means for comparing a clock signal and a delay clock signal, wherein the means for comparing produces a control pulse output, means for producing a controllable DC bias voltage according to a duty cycle of the control pulse output, means for delaying having an input coupled to the clock signal, wherein an output of the means for delaying forms the delay clock signal, and wherein the DC bias voltage is coupled to a body of the means for delaying, and means for performing a digital function, wherein a body of the means for performing is coupled to the DC bias voltage. According to an embodiment, the means for comparing is an AND gate. The same clock signal compared in the means for comparing is advantageously coupled to the means for performing a digital function. The means for delaying comprises a plurality of logical inverters coupled in series, and the means for performing a digital function comprises a CMOS circuit. The means for delaying and the means for performing a digital function are comprised of materials configured to degrade in performance at a substantially identical rate over time. According to an embodiment, the means for producing a controllable DC bias voltage comprises a plurality of pumping stages, a pumping stage comprising a transistor having a gate coupled to a capacitor.

DETAILED DESCRIPTION OF THE INVENTION

Reference will now be made in detail to the preferred embodiments of the invention, examples of which are illustrated in the accompanying drawings. Although the following detailed description of the present invention includes numerous specific details set forth in order to provide a thorough understanding of the present invention, it will be readily apparent to one of ordinary skill in the prior art that the present invention may be practiced without these specific details. Minor variations of the disclosed invention will become apparent to those skilled in the art after studying the teachings disclosed herein. For example, specific reference is frequently made to a specific transistor type, p-channel, n-channel, CMOS integrated circuits, etc. Those skilled in the art will understand that the present invention may be applied to a wide variety of solid state and transistor structures. The recitation of these and other specific structures are offered to more fully explain and enable the present invention, not to limit it to one particular embodiment. The invention is intended to cover alternatives, modifications and equivalents, which may be included within the spirit and scope of the invention as defined by the appended claims. In other instances, numerous details which are commonly known and understood by those skilled in the art have not been recited within the present disclosure so as not to unnecessarily obscure aspects of the present invention.

Figure 2:
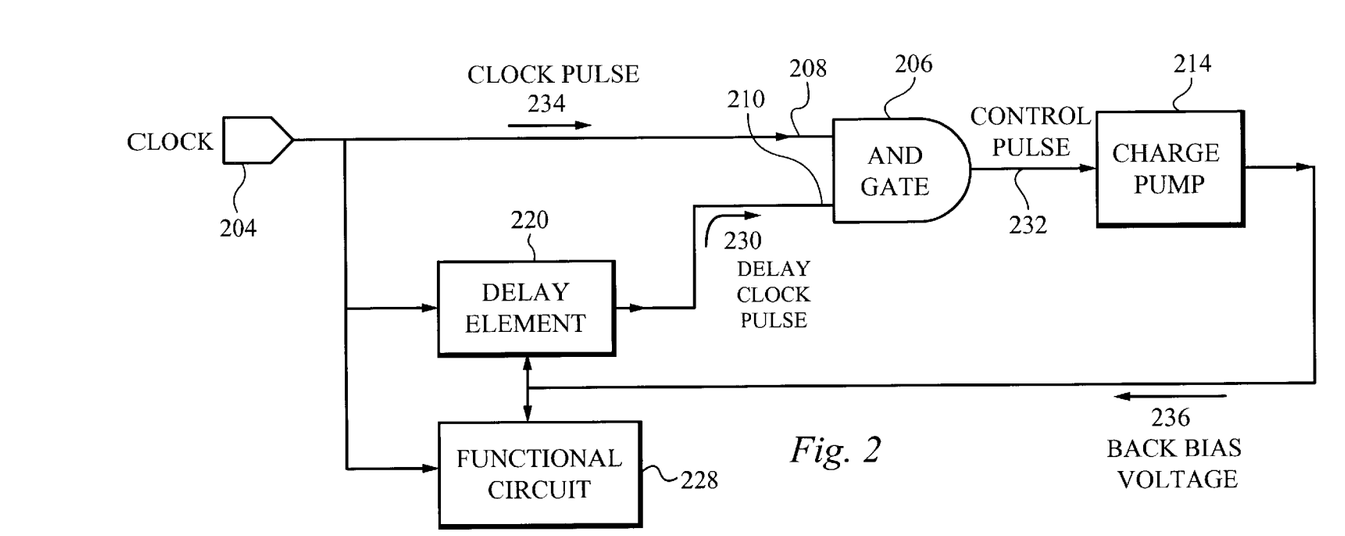
FIG. 2 is a closed loop voltage regulator for regulating the back bias voltage used to regulate the threshold voltage of the functional circuit.

FIG. 2 illustrates a closed loop voltage control circuit for regulating a back bias voltage 236 to a functional circuit 228, preferably a CMOS integrated circuit. The closed loop comprises a delay element 220 advantageously comprised of materials similar to the functional circuit 228 which it serves to regulate. As the delay element 220 degrades with time due to heat, radiation, and other factors, the switching speed of the circuits within the delay element 220 slow, increasing the delay $T_{DELAY}$ as discussed further in FIGS. 4–6. A closed loop monitors the delay $T_{DELAY}$ within the delay element 220, and continually adjusts the back bias voltage 236 applied to the delay element 220, maintaining the delay time $T_{DELAY}$ generated by the delay element 220 at an optimal predetermined value. The same back bias voltage 236, or a ratio thereof, is then applied to the functional circuit 228. Because the materials and manufacturing processes of the delay element 220 are selected such that the operation and degradation of the delay element approximates that of the functional circuit 228, the back bias voltage 236 produced through the closed loop process also adjusts to the progressive deterioration of the functional circuit 228 over the life of the circuit 228.

According to the embodiment disclosed in FIG. 2, a clock 204 is coupled to a functional circuit 228. In order to maintain an optimal back-bias voltage 236 on the functional circuit 228 a closed loop is formed by coupling the clock 204 to a first input 208 of an AND gate 206 and to an input of the delay element 220. A delay clock pulse 230 is formed on the output of the delay element 220. The output of the delay element 220 is coupled to the second input 210 of the AND gate 206. The input and output signals associated with the AND gate 206 are discussed in greater detail in conjunction with FIGS. 4–6.

The clock pulse 234 and the delay clock pulse 230 oscillate from a binary high logic state to a binary low logic state, respectively forming square waves. Preferably, the high states and low states are of equal duration. Accordingly, as discussed in greater detail below in conjunction with FIGS. 4–6, if the clock pulse 234 and the delay clock pulse 230 are in phase, the control pulse 232 of the AND 206 output will be in a high voltage state approximately fifty percent of the time. If the clock pulse 234 and the delay clock pulse 230 are out of phase, at least one input 208, 210 of the AND will always be in a low logic state, and the control pulse 232 produced at the AND output will be in a perpetual low logic state. Accordingly, the duty cycle of the control pulse 232 produced by the AND output can range from fifty percent to zero percent.

The AND gate 206 output is coupled to the charge pump 214 input. Accordingly, the control pulse 232 formed by the AND gate 206 controls the activity of the charge pump 214, which determines the back bias voltage 236. As discussed in greater detail below in conjunction with FIG. 7, the output voltage produced by the charge pump 214, which forms the back bias voltage 236 applied to the delay element 220 and the functional circuit 228, is highest when the control pulse 232 input into the charge pump has a duty cycle of fifty percent. As the duty cycle of the control pulse decreases below fifty percent, or, in alternative embodiments of the present invention, increases above fifty percent, the back bias voltage 236 produced by the charge pump 214 decreases from its maximum output.

The output of the charge pump 214 is coupled to the delay element 220 and the functional circuit 228, thereby applying the back bias voltage 236 produced by the charge pump 214 to the substrate of both the functional circuit 228 and the delay element 220. As the back bias voltage 236 decreases, the circuit speed of both the delay element 220 and the functional circuit 228 increase. Conversely, as the back bias voltage 236 increases, the speed of the delay element 220 and the functional circuit 228 decreases. As will be better appreciated in conjunction with FIGS. 3–6, the delay element 220 can be constructed such that as the delay element 220 slows down below the predetermined circuit speed, the phase difference between the clock pulse 234 and the delay clock pulse 230 increases, thereby decreasing the duty cycle of the control pulse 232, thereby reducing the back bias voltage 236 produced by the charge pump 214. This, in turn, speeds delay element 220 back up to its desired speed. Conversely, if the delay element 220 operates faster than a predetermined speed, the closed loop process described above acts to slow down the delay element 220 to a predetermined speed. Since the back bias voltage 236 is simultaneously applied to both the delay element 220 and the functional circuit 228, the speed of the functional circuit 228 is likewise maintained at a desired operational speed by this process.

Figure 3:
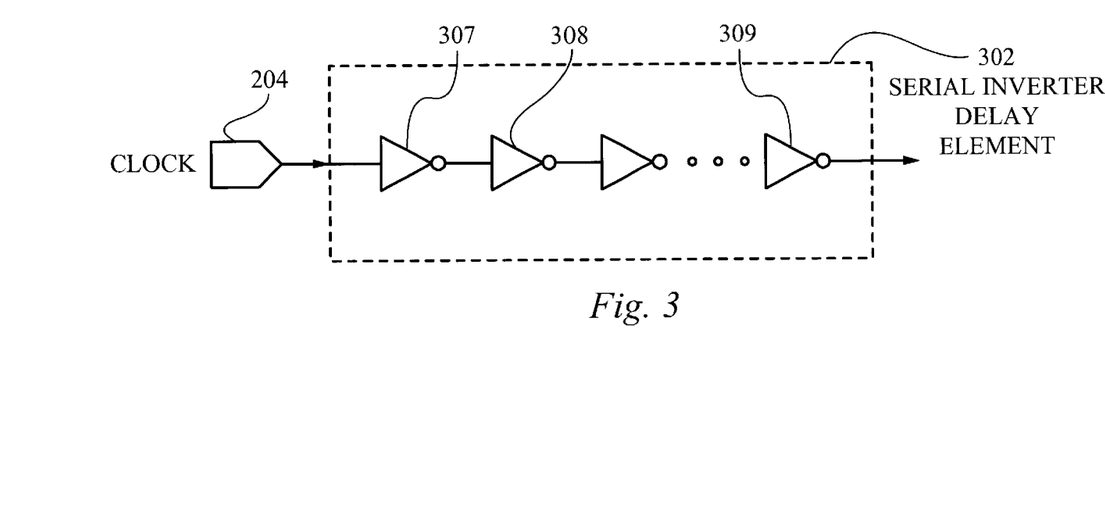
FIG. 3 is a delay element comprising a plurality of inverters.

FIG. 3 discloses one embodiment of a delay element 302 comprising a plurality of inverters 307, 308, 309 arranged in series. Because an inverter effectively creates a 180 degree phase shift, an even number of inverters arranged in series will restore an output signal of the delay element 220 to the same phase as an incoming signal. When a delay element is comprised of inverters as illustrated in FIG. 3, according to the preferred embodiment, an even number of inverters is used, thereby maintaining an "in phase" relationship between an input signal and an output signal. As the threshold voltage within an inverter is raised, the switching time is slowed, creating a phase shift as a result of the critical path delay. The input terminal on the first inverter 307 forms the delay element 220 input of FIG. 2, and the output terminal on the last inverter 309 forms the delay element 220 output of FIG. 2. Because each inverter must reach a predetermined voltage before it switches, the delay created by series of inverters 307–309 depicted in FIG. 3 is proportional to the number of inverters. The specific number of inverters is therefore preselected to regulate the functional circuit 228 at a predetermined speed. Different numbers of inverters will therefore be appropriate for operation in conjunction with different functional circuits 228. The multi-inverter delay element depicted in FIG. 3 is not intended to limit alternative embodiments of a delay element, but is illustrative of one way in which a delay element can be constructed. The invention described herein can operate with any collection of circuitry that delays the clock signal and experiences degradation similar to that of the functional circuit 228. Similarly, although the invention disclosed herein is generally described in terms of a non-inverted delay processed by an AND gate, the present invention envisions equivalent embodiments which utilize an inverted delay pulse processed through comparators comprising alternative logic gating, such as an OR gate or a NOR gate. Accordingly, the pulse samples illustrated in the accompanying drawings are not intended to limit the present invention. To ensure that the delay of the delay element 220 approximates the delay experienced in the functional circuit 228 over the life of the circuit, the delay element will most advantageously comprise semiconductor materials with properties similar or identical to the functional circuit 228.

As noted, a slowing of the switching time of the inverters 307, 308, 309 increases the time delay $T_{DELAY}$ (FIGS. 4–6) between the clock pulse 234 and the delay clock pulse 230 respectively occurring at the input and the output of the delay element 220. By comparing the delay clock pulse 230 to the original clock pulse 234, the extent of the delay can be determined. To avoid the use of expensive components such as elaborate phase locked loops and pulse counters, the preferred embodiment of the present invention utilizes a basic AND gate 206 to compare the clock pulse 234 and the delay clock pulse 230. Accordingly, the clock pulse 234 is coupled to the first input 208 of the AND gate 206, and the delay clock pulse 230 is coupled to the second input 210 of the AND gate 206. According to this configuration, the AND gate 206 output is only in a high logic state when both clock pulse 234 and the delay clock pulse 230 are in a high logic state.

Figure 4:
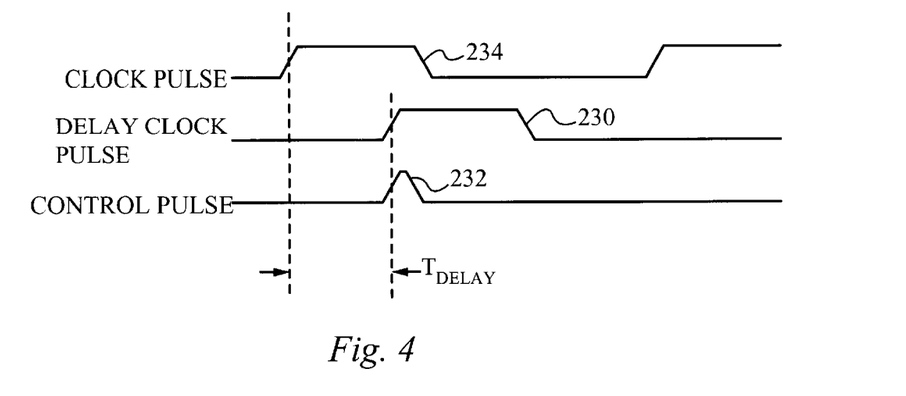
FIG. 4 is a timing diagram during steady state operation.

FIG. 4 is an exemplary timing diagram illustrating the relationship of the clock pulse 234, and the delay clock pulse 230 entering the input terminals 208, 210 of the AND gate 206, and the control pulse 232 produced at the output of the AND gate 206. The delay clock pulse 230 lags the clock pulse 234 by a delay time $T_{DELAY}$. During the delay time $T_{DELAY}$, the clock pulse 234 at the first AND input 208 is in a high voltage state, and the delay clock pulse 230 at the second AND input 210 is in a low voltage state, resulting in a control pulse 232 in a low voltage state. As FIG. 4 further illustrates, when the delay clock pulse 230 and the clock pulse 234 are simultaneously in a high state, the control pulse 232 formed at the AND gate 206 output is in a high state. Accordingly, as the delay time $T_{DELAY}$ increases, the pulse width of the control pulse 232 decreases.

As the delay element degrades through temperature, radiation, or any other cause, the switching time of the delay element 220, 302 is slowed, thereby increasing the delay time $T_{DELAY}$ through the delay element 220. It is recalled that the present invention is advantageously to slow the operation of the functional circuit 228 to the slowest possible speed that is capable of reliably maintaining circuit performance, thereby lowering power consumption. Defining the duty cycle of FIG. 4 as optimum for a particular circuit, giving rise to a steady state operation, FIGS. 5 and 6 can be contrasted against it to illustrate the operation of the present invention.

Figure 5:
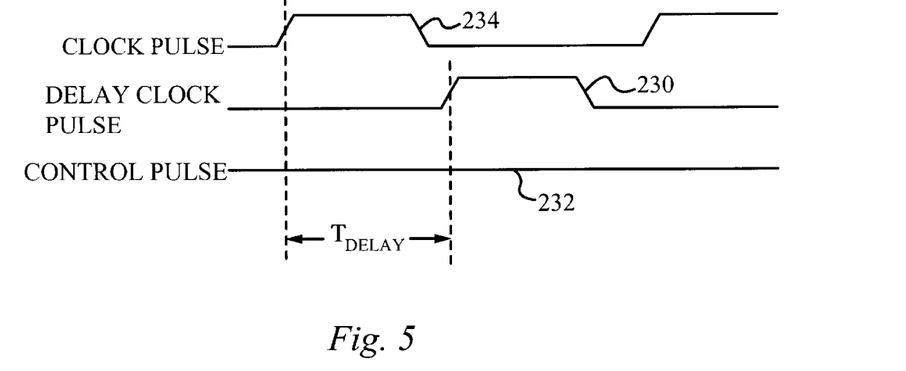
FIG. 5 is a timing diagram when the delay element is too slow.

FIG. 5 displays signals associated with a delay element 220 which has been slowed beyond the acceptable limit. It is noted that the delay time $T_{DELAY}$ in FIG. 5 has become so great that by the time the delay clock pulse 230 rises to a high voltage state, the clock pulse 234 has already transitioned to a low voltage state. As a result, the control pulse 232 remains in a low voltage state continually. Because the closed loop circuit of FIG. 2 will act to correct the speed of delay element as it drifts from its ideal speed, in practice, the delay time $T_{DELAY}$ will not reach the state of FIG. 5 under normal operating conditions. However, as will be understood in conjunction with FIG. 7, if a duty cycle of zero as depicted in FIG. 5 were present, the back bias voltage 236 produced by the charge pump 214 would be zero. As the back bias voltage applied to a CMOS circuit is reduced, the circuit runs faster. Accordingly, the excessive delay of the delay clock pulse 230 of FIG. 5 would give rise to a self correcting back bias voltage, speeding up the delay element 220 and reducing the delay $T_{DELAY}$.

Figure 6:
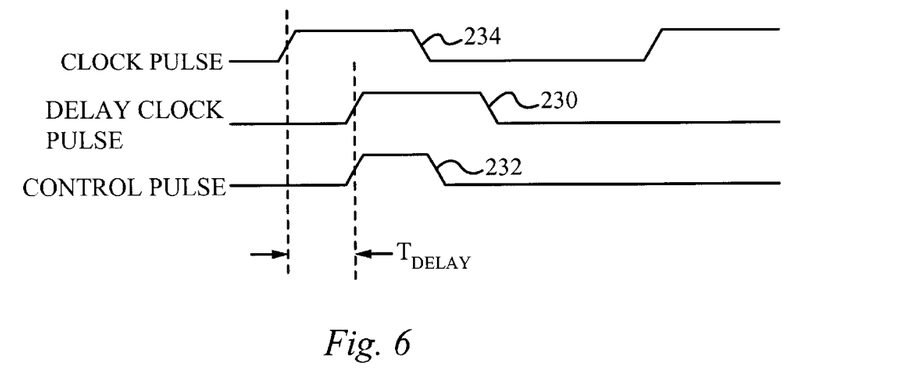
FIG. 6 is a timing diagram when the delay element is too fast.

Alternatively, as illustrated in FIG. 6, if the delay time $T_{DELAY}$ through the delay element 220 is shorter than the optimum delay $T_{DELAY}$ depicted in FIG. 4, the duty cycle of the control pulse 232 in FIG. 4 is seen to be closer to 50% than the optimum duty cycle of FIG. 4. As the duty cycle of the control pulse 232 approaches 50%, the charge pump of FIG. 7 will increase the back bias voltage 236 being applied to the functional circuit 228 and the delay element 220, 302.

Figure 7:
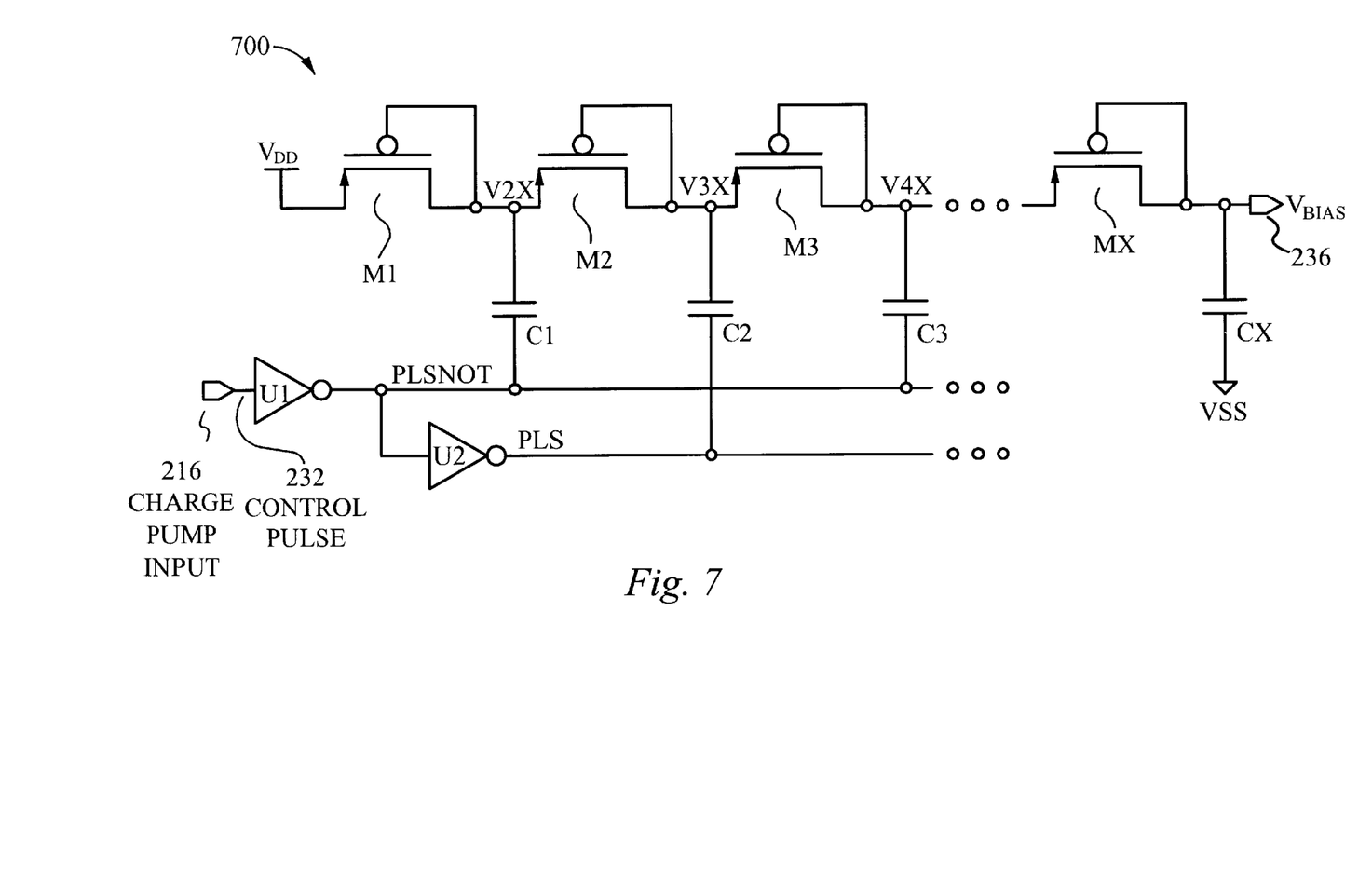
FIG. 7 is an embodiment of a charge pump using p-channel MOSFETs.

The charge pump generates a voltage that is above the power supply voltage for use as the body bias. An example of a charge pump using diode-connected MOSFETs is shown in FIG. 7. The charge pump consists of two inverters, U1 and U2, a number of pumping stages (M1/C1, M2/C2, M3/C3, etc.) and an output filter composed of transistor MX and capacitor CX.

To illustrate the functionality of the charge pump 700, it is assumed that the PULSE input to the charge pump is initially a binary high voltage state 1, such that the PLSNOT signal is a binary low voltage state 0. It is further assumed that all capacitors are discharged in their initial state. From this, the node V2X is also in a binary low state 0. The diode-connected PMOS transistor M1 will only conduct current when the common gate/drain node is at a lower voltage than the source node. Since M1's source node is connected to $V_{DD}$, and its gate/drain node is in a low voltage state 0, current will flow through M1 to charge C1 and bring node V2X to $V_{DD}$ or a binary 1. Similarly, node V3X must be a 1 because PLS is a 1 and C2 is discharged, so capacitor C3 is charged by current flowing through M3. Since V3X is at a higher voltage than V2X, no current flows through M2.

If the PULSE input then falls to a low voltage 0, PLSNOT will rise to a 1 and PLS will fall to a 0. Since C1 has been charged, node V2X will rise to approximately $2\times V_{DD}$. Node V2X is now at a higher voltage than node V3X so transistor M2 conducts current into capacitor C2, bringing the voltage across this capacitor to approximately $2\times V_{DD}$, owing to the relationship $V_{C1}+V_{DD}\approx 2\times V_{DD}$. No current flows through M1 because V2X is at a higher voltage than $V_{DD}$.

As the PULSE input then rises to a 1, the voltage at node V3X will be increased to $3\times V_{DD}$ because node PLS will rise from a 0 to a 1 and capacitor C2 has been charged to $2\times V_{DD}$. Since node V3X is now at a higher voltage than node V4X, transistor M3 will conduct current into capacitor C3, bringing the voltage across this capacitor to approximately $3\times V_{DD}$.

This process repeats indefinitely, with capacitor C1 gathering charge from $V_{DD}$ when PLSNOT is low and then passing that charge to C2 when PLSNOT is high. Likewise, capacitor C2 gathers charge from node V2X when PLS is 0 and then passes that charge to C3 when PLS is 1. The diode-connected transistors allow current to flow only in one direction: from $V_{DD}$ toward the output, $V_{BIAS}$. Each pumping stage M1/C1, M2,C2, M3/C3, etc., increases the peak output voltage by approximately the value of $V_{DD}$.

The voltage at the output of any pumping stage N alternates between $N\times V_{DD}$ and $(N+1)\times V_{DD}$. A voltage fluctuation of $V_{DD}$, however, would be an unacceptably large a.c. component superimposed on the bias voltage. The final output filter stage MX/CX comprising transistor MX and capacitor CX acts to remove most of the a.c. component and provide a stable voltage for $V_{BIAS}$. In practice, capacitor CX will typically consist of the large parasitic capacitance that is inherent in the construction of the integrated circuit. The average current drawn from this capacitance is the leakage current through reverse biased P-N junctions and is therefore quite small. As a result, relatively small transistors can be used in the pumping stages and the output filter, and $V_{BIAS}$ will be substantially free of switching noise.

The diode-connected transistors in the charge pump, however, do not act as ideal diodes. They will not start to conduct current until the voltage at the source node exceeds the voltage at the common gate/drain node by at least the threshold voltage, $V_{TH}$, of the transistor. Given this factor the peak voltage at state N of the charge pump is $(N+1)\times (V_{DD}-V_{TH})$. It can be understood that if the supply voltage $V_{DD}$ were reduced to an amount equal to the threshold voltage $V_{TH}$, the charge pump will cease to pump any charge. According to the preferred embodiment, therefore, the respective threshold voltages $V_{TH}$ of transistors M1–MX is less than or equal to 100 mV. At these threshold levels, the charge pump 700 is able to operate at ultra low power voltage levels of 500 mV or less. Although the preferred embodiment for charge pump 700 incorporates MOSFETs for transistors M1–MX, in applications where the supply voltage $V_{DD}$ is above 1 volt, embodiments are envisioned which substitute conventional P-N junctions for the diode-connected MOSFETs.

The example described here used PMOS transistors to generate a $V_{BIAS}$ voltage that is above the level of $V_{DD}$. However, those skilled in the art will recognize that the PMOS transistors could be replaced with NMOS transistors and the source of the first transistor connected to ground. This modification would result in a $V_{BIAS}$ level that was below ground.

Although the leakage current drawn from VBIAS is small, it is not negligible, and the charge pump must constantly resupply this current. Each toggle of the control pulse 232, both the on-to-off transition, and the off-to-on transition, equally function to accumulate charge on the respective capacitors, or, alternatively, to pump charge from a capacitor across the next transistor to the next junction. As the duty cycle of the control pulse 232 is shortened from 50% to 0% however, the charging period for one set of capacitors is progressively shortened. Those familiar with the charging characteristics of a capacitor will therefore understand that a maximum voltage output of the charge pump will occur when the control pulse 232 duty cycle is at 50%. According to the preferred embodiment of the present invention, during steady state operation, the propagation time of the delay element 220, 302 will be slightly less than the CLOCK pulse width, causing narrow pulses on the CONTROL PULSE 232 output, as shown in FIG. 4. Moreover, by setting a steady state operation such that the duty cycle of the control pulse 232 is between zero-and fifty percent, the back bias voltage 236 produced at the charge pump 214 output can be increased or decreased by increasing or decreasing the duty cycle of the control pulse 232. According to embodiments of the present invention utilizing an AND gate as a comparator, the duty cycle can have a maximum of 50% and a minimum of zero. However, alternative logic comparators such as a NAND gate are envisioned within the scope of the present invention. In some alternative designs, the duty cycle would vary from a minimum of 50 percent to a maximum of 100 percent. In substituting such equivalent embodiments of the present invention, however, the fundamental operation remains the same. The charge produced by the charge pump reaches a maximum at a 50 percent duty cycle, and decreases toward a zero voltage output as the duty cycle moves away from the fifty percent point. Such equivalent embodiments are envisioned within the scope of the present invention.

Referring again to FIG. 6, it can be understood that when the delay element 220, 302 is too fast, the increased duty cycle of the control pulse 232 signal will cause the charge pump to quickly raise the voltage on $V_{BIAS}$. As $V_{BIAS}$ rises it causes the threshold voltages of the transistors in the delay element to increase their switching time and thus increases $T_{DELAY}$. As $T_{DELAY}$ is increased, the pulses on PULSE become narrower until the steady state condition shown in FIG. 4 is reached.

It can similarly be understood that when the delay element is too slow and the duty cycle of the control pulse 232 is shorter than the steady state duration of FIG. 4, such as the no-control-pulse condition of FIG. 5, leakage currents will discharge CX and cause the voltage on $V_{BIAS}$ 236 to fall. As $V_{BIAS}$ 236 falls, the threshold voltages of the transistor in the delay element will decrease, which speeds up the switching time of the inverters 307–309, or any other transistor structure used in the delay element 220, thereby decreasing $T_{DELAY}$. Once $T_{DELAY}$ becomes less than the width of the CLOCK pulse 234 (FIG. 5) then pulses will start to appear on the control pulse 232. When the control pulse 232 becomes wide enough (FIG. 4) to replenish the charge on CX lost to leakage currents, the circuit of FIG. 2 will have again reached the steady state condition.

Since $V_{BIAS}$ 236 is applied to the functional circuit as well as the delay element, and the propagation delay of the delay element is directly related to the critical path delay in the functional circuit, the critical path delay will also be slaved to the width of the CLOCK pulse 234. The present invention will adjust $V_{BIAS}$ as necessary to maintain this relationship despite the effects of aging, radiation, and temperature. By setting $V_{BIAS}$ 236 and hence the transistor threshold voltages, at the highest level that allows the circuit to meet its functional timing requirements, the present invention also minimizes power consumption due to transistor leakage current.

The present invention provides a method and apparatus for reducing the power consumption of a CMOS circuit by controlling back bias voltage applied to a CMOS circuit. The back bias is controlled by means of a closed loop circuit that detects change in the operational speed of a delay element. A clock pulse 234 drives a functional circuit 228 and a delay element 220. Any change in the time delay experienced within the delay element 220 is detected by processing the output of the delay element and the clock pulse 234 through an AND gate, the output of which forms a control pulse 232. As the duty cycle of the control pulse falls from fifty percent to zero, a charge pump decreases the voltage output. The voltage output serves as a back bias voltage for both the delay element and the functional circuit. The closed loop circuit therefore allows the delay element to operate at a predetermined speed. The predetermined speed can be set to minimize power consumption while maintaining the circuit speed of the functional circuit 228 at a reliable level. This process avoids the addition of excessive ancillary components such as fixed reference voltage sources, fixed current sources, fixed resistors forming voltage dividers for reference voltages, variable speed clocks, op-amps, or multiple memory locations storing data defining various voltage levels for application to a back-bias voltage. By avoiding these components which are largely foreign to CMOS devices, a low cost circuit can be configured that is capable of adjusting the body bias on a CMOS circuit so as to minimize power consumption over the life of the circuit while maintaining the circuit at a requisite operational speed.

What is claimed is:

1. An apparatus for regulating a back bias voltage in a functional circuit, comprising:
   a. a closed loop voltage regulator comprising:
      i. charge pump including a charge pump input and a charge pump output providing the back bias voltage;
      ii. a delay element including a delay element input coupled to a clock pulse, a delay element output, and a delay element body, wherein the delay element body is coupled to the charge pump output; and
   b. the functional circuit is coupled to the clock pulse that is also coupled to the delay element input, wherein the functional circuit has a body that is coupled to the back bias voltage, and wherein the back bias voltage is dependent upon a duty cycle of a control pulse at the charge pump input, and the back bias voltage and a switching speed of the delay element operate in an inverse relationship, such that when the back bias voltage is lowered the switching speed of the delay element is increased, thereby reducing a time delay, and such that when the back bias voltage is increased the switching speed of the delay element is lowered, thereby increasing the time delay.

2. The apparatus according to claim 1, wherein the closed loop voltage regulator further comprising a logic element having a logic element output coupled to the charge pump input, the logic element further comprising a first logic input coupled to the clock pulse, and a second logic input coupled to the delay element output.

3. The apparatus according to claim 2 wherein the logic element is an AND gate.

4. The apparatus according to claim 2 wherein the delay element comprises a plurality of logical inverters coupled in series.

5. The apparatus according to claim 2 wherein the functional circuit is a CMOS circuit comprising a substrate, and wherein the substrate comprises the body of the functional circuit.

6. The apparatus according to claim 5 wherein the charge pump output is coupled to the substrate of the functional circuit through a proportional element, wherein the back bias voltage applied to the substrate is proportional to the charge pump output voltage.

7. The apparatus according to claim 5 wherein the charge pump output is coupled directly to the substrate of the functional circuit.

8. The apparatus according to claim 2 wherein the delay element and the functional circuit are comprised of materials configured to degrade in performance at a substantially identical rate over time.

9. The apparatus according to claim 2 wherein the charge pump is comprised of a plurality of pumping stages, wherein each pumping stage includes a transistor having a gate coupled to a capacitor.

10. The apparatus according to claim 9 wherein the transistor within at least one of the pumping stages exhibits a threshold voltage of less than 110 mV.

11. A method for regulating a back bias voltage on a functional circuit comprising:
   a. controlling a duty cycle of a control signal controlling a switching speed;
   b. adjusting an output voltage of a charge pump according to the duty cycle of the control signal; and
   c. applying the back bias voltage to the functional circuit, wherein the back bias voltage is related to the output voltage of the charge pump and inversely related to the switching speed of a delay element, such that when the back bias voltage is lowered the switching speed of the delay element is increased, thereby reducing a time delay, and such that when the back bias voltage is increased the switching speed of the delay element is lowered, thereby increasing the time delay, and wherein the control signal is generated at an output of a logic element.

12. The method according to claim 11 wherein the step of controlling a duty cycle comprises the steps:
   a. receiving a clock pulse into an input of the delay element;
   b. receiving the clock pulse into a first input of the logic element; and
   c. receiving an output signal generated at an output of the delay element into a second input of the logic element.

13. The method according to claim 12 wherein the logic element is an AND gate.

14. The method according to claim 12 further comprising the step of coupling the output of the logic element to an input of the charge pump.

15. The method according to claim 12 wherein the output voltage of the charge pump is at a maximum voltage when the duty cycle of the control signal is approximately 50%.

16. The method according to claim 12 wherein the delay element and the functional circuit are comprised of materials configured to degrade at a substantially identical rate over time.

17. The method according to claim 12 wherein the charge pump is comprised of a plurality of pumping stages, wherein each pumping stage includes a transistor having a gate coupled to a capacitor.

18. The method according to claim 17 wherein the transistor within at least one of the pumping stages exhibits a threshold voltage of less than 110 mV.

19. The method according to claim 12 wherein the delay element comprises a plurality of logical inverters coupled in series.

20. The method according to claim 13 wherein the functional circuit is a CMOS circuit comprising a substrate, and wherein the substrate comprises a body of the functional circuit.

21. A method or reducing power consumption within a functional CMOS circuit comprising a plurality of transistors while maintaining a switching time of the plurality of transistors within an optimum range, the method comprising the steps:
 1. altering a duty cycle of a control-pulse;
 2. regulating a back-bias voltage according to the duty-cycle of the control-pulse, such that if a time delay produced by a delay element exceeds an optimal delay, the duty cycle of the control-pulse is shortened, and the back bias voltage is lowered, the back-bias voltage and a switching speed of the delay element operating in an inverse relationship; and
 3. applying the back-bias voltage to the functional CMOS circuit, wherein the control pulse is formed at an output of an AND gate.

22. The method of reducing power consumption according to claim 21 wherein the step of altering the duty cycle of the control-pulse comprising the steps:
 a. transmitting a clock input signal into a first input of the AND gate;
 b. delaying the clock input signal through the delay element to form a delayed clock signal; and
 c. transmitting the delayed clock signal to a second input of the AND gate.

23. The method of reducing power consumption according to claim 22 further comprising the step of applying the back-bias voltage to the delay element.

24. The method according to claim 23 wherein the output of the AND gate is coupled to an input of a charge pump, and wherein the back bias voltage is proportional to an output voltage of the charge pump.

25. An apparatus for regulating a back bias voltage in a functional circuit, comprising:
 a. means for comparing a clock signal and a delay clock signal, wherein the means for comparing produces a control pulse output;
 b. means for producing the back bias voltage according to a duty cycle of the control pulse output;
 c. means for delaying having an input coupled to the clock signal, wherein an output of the means for delaying forms the delay clock signal, and wherein the back bias voltage is coupled to a body of the means for delaying and is inversely related to a switching speed of the means for delaying, such that when the back bias voltage is lowered the switching speed of the means for delaying is increased, thereby reducing a time delay, and such that when the back bias voltage is increased the switching speed of the means for delaying is lowered, thereby increasing the time delay; and
 d. means for performing a digital function, wherein a body of the means for performing is coupled to the back bias voltage, the means for performing is also coupled to receive the clock signal.

26. The apparatus according to claim 25 wherein the means for comparing is an AND gate.

27. The apparatus according to claim 25 wherein the means for delaying comprises a plurality or logical inverters coupled in series.

28. The apparatus according to claim 25 wherein the means for performing a digital function comprises a CMOS circuit.

29. The apparatus according to claim 25 wherein the means for delaying and the means for performing a digital function are comprised of materials configured to degrade in performance at a substantially identical rate over time.

30. The apparatus according to claim 25 wherein the means for producing said back bias voltage comprises a plurality of pumping stages, wherein each pumping stage includes a transistor having a gate coupled to a capacitor.

31. The apparatus according to claim 26 wherein the transistor within at least one of the pumping stages exhibits a threshold voltage of less than 110 mV.

32. An apparatus for regulating a back bias voltage in a functional circuit, comprising:
 a. a closed loop voltage regulator comprising:
  i. charge pump including a charge pump input and a charge pump output providing the back bias voltage;
  ii. a delay element including a delay element input coupled to a clock pulse, a delay element output, and a delay element body, wherein the delay element body is coupled to the charge pump output; and
 b. the functional circuit with a body coupled to the charge pump output, the functional circuit is also coupled to the clock pulse, the functional circuit being manufactured on the same integrated circuit as the closed loop voltage regulator.

33. An apparatus for regulating a back bias voltage in a functional circuit, comprising:
 a. a closed loop voltage regulator comprising:
  i. charge pump including a charge pump input and a charge pump output providing the back bias voltage;
  ii. a delay element including a delay element input coupled to a clock pulse, a delay element output, and a delay element body, wherein the delay element body is coupled to the charge pump output; and
 b. the functional circuit with a body coupled to the charge pump output, the functional circuit is also coupled to the clock pulse, the functional circuit being manufactured on the same integrated circuit as the closed loop voltage regulator, and wherein the back bias voltage is dependent upon a duty cycle of a control pulse at the charge pump input, and the back bias voltage and a switching speed of the delay element operate in an inverse relationship, such that when the back bias voltage is lowered the switching speed of the delay element is increased, thereby reducing a time delay, and such that when the back bias voltage is increased the switching speed of the delay element is lowered, thereby increasing the time delay.

* * * * *